United States Patent [19]  
Stoll et al.

[11] 4,129,147  
[45] Dec. 12, 1978

[54] CONTROL VALVE

[76] Inventors: Kurt Stoll, Lenzhalde 72, D-7300 Esslingen; Ulrich Kees, Im Pfeifferwald, D-6670 St. Ingbert, both of Fed. Rep. of Germany

[21] Appl. No.: 764,560

[22] Filed: Feb. 1, 1977

[30] Foreign Application Priority Data

Feb. 17, 1976 [DE] Fed. Rep. of Germany ....... 2606177

[51] Int. Cl.$^2$ ............................................. F15B 13/04
[52] U.S. Cl. ................................................. 137/596.1
[58] Field of Search ....................... 137/596, 596.1, 82; 91/434, 457

[56] References Cited

U.S. PATENT DOCUMENTS

| | | | |
|---|---|---|---|
| 1,193,036 | 8/1916 | McElroy | 137/596.1 |
| 2,184,413 | 12/1939 | Della Chiesa et al. | 137/596.1 |
| 3,645,293 | 2/1972 | Pederson | 137/608 |

Primary Examiner—Martin P. Schwadron  
Assistant Examiner—A. Michael Chambers  
Attorney, Agent, or Firm—Watson, Cole, Grindle & Watson

[57] ABSTRACT

A control valve includes a generally hollow, cylindrically-shaped main body which at one end is integrally connected to a nozzle which has a bore therethrough and a flat external annular sealing surface which is contactable by a separate sealing element. Inside of the main body is positioned a valve part which at one end includes separate inlet and outlet hose connections for separate connection to, respectively, a pressurized control medium and to a controlled operating unit which controls the operation of the movement of the sealing element, and at the other end has a hollow cylindrical interior in which is positioned an axially-loaded spring, a valve piston and a sealing ring, the spring loading the valve piston against the sealing ring. A rod or tappet which at one end contacts the separate sealing element extends through the bore in the nozzle and through an axial bore in the sealing ring and abuts against the valve piston. A bore provides for fluid communication between the hose connection connected to the pressurized control medium and the hollow cylindrical interior of valve body and, when the separate sealing element is in contact with the flat external annular sealing surface of the nozzle, the inlet hose connection and the outlet hose connection are in fluid communication.

6 Claims, 1 Drawing Figure

U.S. Patent  Dec. 12, 1978  4,129,147
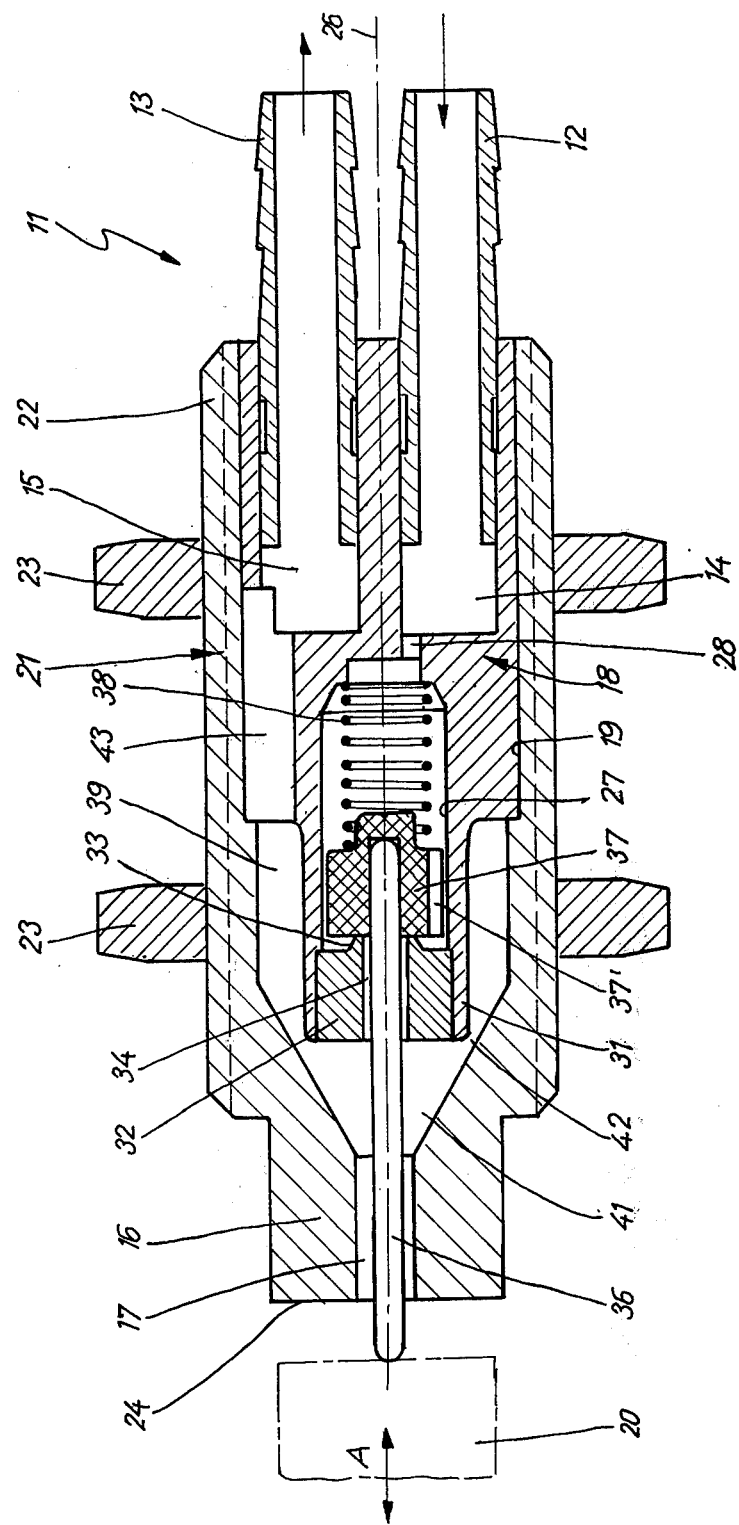

CONTROL VALVE

The invention relates to a fluid transfer apparatus in the form of a control for example, a "Fluidic" value.

DESCRIPTION OF THE PRIOR ART

Control valves of the type which include an inlet connection for a control medium that is maintained continuously under pressure, a nozzle which may be sealed off in a pressure-tight manner by a sealing element interacting with a controlled operating unit, and a connection for the return-flow communicating with the nozzle, are, for example, used for the reversal of hydraulically or pneumatically operated piston/cylinder units which are loaded from either side. The connection between the inlet for the pressure medium and the nozzle orifice is uninterrupted, and the medium, which may for example be compressed air, is therefore continuously discharged from the orifice until the nozzle is closed by the sealing element. The flow direction of the medium is then reversed, after which the compressed air, carried to the return-flow outlet, initiates the reversal of the piston/cylinder unit. This constant discharge of the pressure medium from the nozzle orifice constitutes a severe drawback of the control valve because of the high losses in compressed air caused by its excessive consumption. It is considered an additional drawback that the noise level created in the region of the orifice by the constant discharge of the pressure medium is very high. This is particularly tiresome in an otherwise quiet environment.

It is also known that the reversal of an operating unit may be effected by the aid of three-way valves located at the reversal points. However, the accuracy of control achievable with these valves is not very satisfactory because of the tappet movement which in certain conditions must be completed before the valve is ready to switch, and which cannot be accurately adjusted.

SUMMARY OF THE PRESENT INVENTION

According to the present invention there is provided a control valve comprising an inlet for a continuously pressurized control medium, a nozzle arranged to have its bore sealed in a pressure-tight manner by a sealing element interacting with a controlled operating unit, an outlet communicating with the nozzle for control of the operating unit by the control medium, means defining a passage providing communication between the inlet and the nozzle bore, and control means which is operable to close the passage, but to open the passage immediately before the nozzle bore is sealed.

Preferably, the control means comprises a tappet which projects beyond a sealing surface of the nozzle and is engageable by the sealing element, the tappet extending through the nozzle; and the sealing surface, which surrounds the nozzle bore, is preferably hardened.

Preferably also, the passage is coaxial with the nozzle bore and is located immediately opposite the latter.

Advantageously, the tappet extends into the passage and the effective annular area defined in the passage by the tappet is smaller than the effective annular area defined in the nozzle bore by the tappet.

DESCRIPTION OF THE DRAWINGS

An embodiment of the present invention will now be described by way of example only with reference to the accompanying drawing, the single FIGURE of which shows a longitudinal section through a control valve according to the invention.

DESCRIPTION OF THE PREFERRED EMBODIMENT

A fluid transfer apparatus in the form of a control valve 11, for example a "Fluidic" valve serves for controlling the reversal of a phneumatically operated piston/cylinder unit which is loaded from either side. The control valve 11 is equipped with two hose connections 12, 13, one of which, i.e., the inlet 12, leads into an intake bore 14 and is connected with a continuous pressure source (not shown in the drawing); while the other, i.e., the outlet 13, terminates in a return flow bore 15 and is connected with a reversal system of the piston/cylinder unit (not shown in the drawing). The control valve 11 further comprises a nozzle 16 located at the end of the control valve remote from the connections 12, 13, and has an axial bore 17 against which a sealing element 20, which interacts with the piston of the piston/cylinder unit and is movable in the directions of the arrow A, may be engaged to provide a pressure-tight seal.

The connections 12, 13 are pressed into bores of a valve part 18 so as to extend parallel to one another in the axial direction, the valve part 18 being in turn inserted into the bore 19 of a valve main body 21, for example, in a press fitted connection, to be held in position. The main body 21, and the valve part 18 are each of cylindrical cross-section. The main body 21 has an external precession thread so that it may be screwed into a supporting unit (not shown in the drawing) to enable the control valve to be axially adjusted against the sealing element 20 with which it interacts. This adjustable fixed stop may be arrested by the aid of two nuts 23 which are screwed along the external thread 22. The valve main body 21 is integral with the nozzle 16, the external diameter of the latter being smaller than that of the body 21, and the nozzle 16 having a plane-ground, hardened, annular sealing surface 24 surrounding the orifice of the axial bore 17 to enable the corresponding surface of the sealing element 20 to provide a pressure-tight seal without repeated reversals affecting the sealing.

The valve part 18 is provided on the end thereof remote from the connections 12, 13 with a sleeve-like, reduced diameter extension 31 which is axially supported by engagement of the body 18 against a step in the bore 19 of the valve main body 21 and incorporates a stepped, axial blind bore 27. The latter extends concentrically with a longitudinal axis 26 of the valve main 11, or rather the valve main body 21, to the inner end of the valve part 18, and is connected with the intake bore 14 through a small, eccentric axial bore 28 in the valve part 18. In the region of its extension 31, the blind bore 27 is fitted with a ring 32 which is pressed tightly into the bore 27 and has on its inner end an integral, acute-angled projection constituting an annular valve seat 33. A central, axial bore 34 through the ring 32 accommodates a rod or tappet 36, a free operating end of which extends through the central bore 17 in the nozzle, projecting from the sealing surface 24 of the nozzle 16 preferably by approximately 1 to 2 mm.

The end section of the tappet 36, which is located inside the blind bore 27, is fixed to a valve piston 37 which, being loaded by a coil spring 38, provides a pressure-tight seal against the valve seat 33. One end of this coil spring 38 surrounds a reduced diameter section of the valve piston 37, and the other end is supported against a step in the end-face region of the blind bore 27. At a certain point on its circumference the valve piston 37 comprises an axial groove 37' between the inner wall of the blind bore 27 and the valve seat 33. The effective annular area between the tappet 36 and the wall of the bore 34 through the ring 32, which is located in coaxial alignment with and immediately opposite the bore 17, is smaller than the effective annular area between the tappet 36 and the wall of bore 17.

Between the sleeve-like extension 31 of the valve part 18 and the bore 19 of the valve main body 21 is defined an annular chamber 39 which leads into a conical chamber 41 tapering in a direction towards the bore 17, an annular bottleneck zone 42 being created at a given point between the conical internal surface of the bore 19 and the free end of the extension 31. The valve part 18 comprises an axial, eccentric groove 43 in the region thereof which is remote from the small eccentric bore 28, the groove 43 communicating at one end with the annular chamber 39 and at the other end with the return-flow bore 15, the inner wall surface of the valve main body 21 defining its circumferential contour.

In the condition of the operating mode of the control valve 11 as shown in the FIGURE, the sealing element 20 associated with the piston/cylinder unit (not shown in the drawing) has reached the tappet 36 and is still advancing towards the control valve 11, and both the intake bore 14 and the valve piston 37 are pressure loaded, the latter, responding to the pressure, acting against the valve seat 33 and sealing the annular passage 34 which connects the bore 17 with the return-flow bore 15. As the sealing element 20 continues to advance, the tappet 36 is pushed in shortly before the sealing element 20 can engage the hardened sealing surface 24. The valve piston 37 is thereby lifted off the valve seat 33, thereby opening the orifice of the annular passage 34. The pressure medium in the intake bore 14 can therefore reach the bore 17 in the valve main body 21 through the annular passage 34 along a straight path without having to take by-passing turns. It is due to the ratio between the effective areas of the two annular passages and the features of the connection with the return-flow bore 15, which includes a by-pass and a bottleneck, that essentially all of the pressure medium admitted through the intake bore 14 is expelled through the bore 17 instead of some pressure medium forming eddies or similar effects which might divert the pressure medium towards the return-flow bore 15. The sealing element 20, continuing to advance, is pressed against the sealing surface 24 so that it closes the orifice of the bore 17 in an essentially pressure-tight manner.

Since the annular passage 34 is still open at this time, whereas the bore 17 is already sealed, the pressure medium passing through the passage 34 accumulates in front of the bore 17, that is to say, inside the conical chamber 41, to be redirected towards the return-flow bore 15 and thence to the reversing unit (not shown in the drawing), thereby initiating the reversal of the piston/cylinder unit.

The sealing element 20 is consequently caused to move in the opposite direction, detaching itself from the sealing surface 24. The mode of operation described above is correspondingly reversed during this return stroke. The pressure medium passes again through the passage of the bore 17 as soon as the orifice is released, and the spring-loaded valve piston 37, responding to the load of the compression spring 38, once more provides a pressure-tight seal closing the annular passage 34. It is evident that the reversal impulse given by the pressure medium to the piston/cylinder unit is of a relatively short duration. Since the pressure medium is already in motion at the moment the reversal takes place, the switching accuracy is extremely high, it being approximately 3/100 sec. In addition to this, the consumption of pressure medium, e.g. air, corresponding to the short period of time during which the pressure medium is blown off, is considerably reduced. The component position at which the reversal is carried out can be set very accurately to the most favorable values by using the precision thread.

A control valve as hereinbefore described consumes much smaller, in fact negligibly small, quantities of the pressure medium as compared to previously apparatus, while the switching accuracy is as high as before.

Due to the connection between the inlet for the pressure medium and the nozzle being opened just before the nozzle is sealed by the sealing element, the consumption of compressed air is reduced to a minimum because no compressed air can escape before a given moment of time which occurs only slightly before the moment at which the nozzle is sealed. The period during which air might be discharged is thus very short. However, it is long enough to ensure that the pressure medium is already in motion when reversal takes place. The accuracy of switching is correspondingly great, mainly because there is no need for the inertia of the pressure medium to be overcome at the moment of reversal, this being contrary to the conditions of valves. Compared with that of known valves, the air consumption of the control valve as described has been reduced by approximately 99%, which means that the consumption of the pressure medium is essentially negligible. In addition to this, the reduction of air discharge during the extremely brief periods of time referred to above is not considered tiresome even in very quiet rooms. Compared with the conditions of valves, the reversal of the system, when using the present control valve, is independent of distance.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A control valve comprising:
 a generally hollow main body which is generally open at one end and at the opposite end has a nozzle integrally connected thereto, the nozzle having a central bore therethrough and a flat external annular sealing surface;
 a valve part positioned inside of the main body, the valve part having at one end adjacent the generally open end of said main body two separate means for connection to two separate hoses for control medium, one means for connection to a pressure medium supply and one for pressure medium discharge, and at the other end thereof a hollow portion with an open end facing said nozzle, the interior of said hollow portion being in fluid communication with said one means for connection to a pressure medium supply;
 a spring in the interior of said hollow portion of said valve part, a valve piston in said hollow portion, and a valve ring having a central bore therethrough, said spring biasing said valve piston aginst said valve ring and closing off the open end of said bore therein; and a movable tappet extending at one end through said bore in said nozzle, said tappet having a thickness so as to leave an annular space for fluid flow between said tappet and said nozzle bore, and extending so as to abut against an external sealing element, said tappet extending at its opposite end through the bore in said valve ring and abutting against said valve piston, an annular space for fluid flow being left between said tappet and said bore in said valve ring, said annular space for fluid flow between said tappet and the wall of said valve ring forming the bore therethrough through which said tappet being smaller than said annular space for fluid flow between said tappet and said bore in said nozzle;

the hollow interior wall of said main body forming a bottleneck zone together with the open end of said portion of said valve part such that upon movement of said tappet against the bias of said spring so as to open said central bore of said valve ring, pressure medium from said one means for connection to a pressure medium supply will flow through said annular space in said nozzle, whereas when said bore in said nozzle is closed off by said sealing element, pressure medium will be caused to flow through said one means for pressure medium discharge.

2. The control valve according to claim 1 wherein said generally hollow main body has a cylindrical shape, and wherein said hollow portion of said valve part has a cylindrical shape.

3. The control valve according to claim 1 wherein said central bore in said nozzle is coaxial with the central bore in said valve ring.

4. The control valve according to claim 1 wherein a chamber is formed between said main body and said valve part which provides for fluid communication between said bore in said valve ring and said outlet means, the inner wall of said main body being tapered towards said nozzle and creating a bottle-neck zone with said valve part.

5. The control valve according to claim 1 wherein said main body includes means forming an external thread therearound.

6. The control valve according to claim 1 wherein said flat external annular sealing surface is composed of a hardened material.

* * * * *